United States Patent
Ehrlich

(10) Patent No.: US 9,127,909 B2
(45) Date of Patent: Sep. 8, 2015

(54) FIREARM AIMING SYSTEM WITH RANGE FINDER, AND METHOD OF ACQUIRING A TARGET

(71) Applicant: Avshalom Ehrlich, Kibbutz Ramat Hashofet (IL)

(72) Inventor: Avshalom Ehrlich, Kibbutz Ramat Hashofet (IL)

(73) Assignee: SMART SHOOTER LTD., Kibbutz Yague (IL)

( * ) Notice: Subject to any disclaimer, the term of this patent is extended or adjusted under 35 U.S.C. 154(b) by 169 days.

(21) Appl. No.: 13/769,330

(22) Filed: Feb. 17, 2013

(65) Prior Publication Data

US 2015/0108215 A1     Apr. 23, 2015

(51) Int. Cl.
| | |
|---|---|
| *F41G 3/06* | (2006.01) |
| *G01S 17/02* | (2006.01) |
| *G01S 17/88* | (2006.01) |
| *G01C 3/08* | (2006.01) |
| *F41A 19/58* | (2006.01) |
| *F41G 3/04* | (2006.01) |
| *F41G 3/12* | (2006.01) |
| *F41G 3/16* | (2006.01) |
| *G01S 7/48* | (2006.01) |
| *G01S 17/42* | (2006.01) |

(52) U.S. Cl.
CPC . *F41G 3/06* (2013.01); *F41A 19/58* (2013.01); *F41G 3/04* (2013.01); *F41G 3/12* (2013.01); *F41G 3/165* (2013.01); *G01C 3/08* (2013.01); *G01S 7/4802* (2013.01); *G01S 17/023* (2013.01); *G01S 17/42* (2013.01); *G01S 17/88* (2013.01)

(58) Field of Classification Search
CPC ..... F41A 17/08; F41A 19/58; H04N 5/23296; G01C 3/08; G01S 7/4802
See application file for complete search history.

(56) References Cited

U.S. PATENT DOCUMENTS

| | | | | |
|---|---|---|---|---|
| 4,622,458 | A * | 11/1986 | Boeck et al. | 342/451 |
| 4,922,801 | A * | 5/1990 | Jaquard et al. | 89/41.05 |
| 5,557,685 | A | 9/1996 | Schlossers et al. | |
| 8,051,597 | B1 * | 11/2011 | D'Souza et al. | 42/119 |
| 2006/0005447 | A1 | 1/2006 | Lenner et al. | |
| 2011/0149055 | A1 * | 6/2011 | Burch et al. | 348/61 |
| 2014/0028856 | A1 * | 1/2014 | Ehrlich | 348/169 |

FOREIGN PATENT DOCUMENTS

| | | |
|---|---|---|
| EP | 0628837 | 12/1994 |
| WO | 2006096183 | 9/2006 |

\* cited by examiner

*Primary Examiner* — Bret Hayes
(74) *Attorney, Agent, or Firm* — Mark M. Friedman

(57) ABSTRACT

An aiming system of an aimable device includes a user display, an imaging system, user controls, a tracker, and a range finder such as a LRF. The imaging system displays, on the user display, an indicator of the direction in which the device points. The user uses the user controls to lock on a target towards which the device points according to the indicator. Then the tracker tracks the target, and the range finder measures the range to the tracked target. The tracker aims the range finder at the target, or alternatively scans the target and its background, one-dimensionally or two-dimensionally.

12 Claims, 10 Drawing Sheets

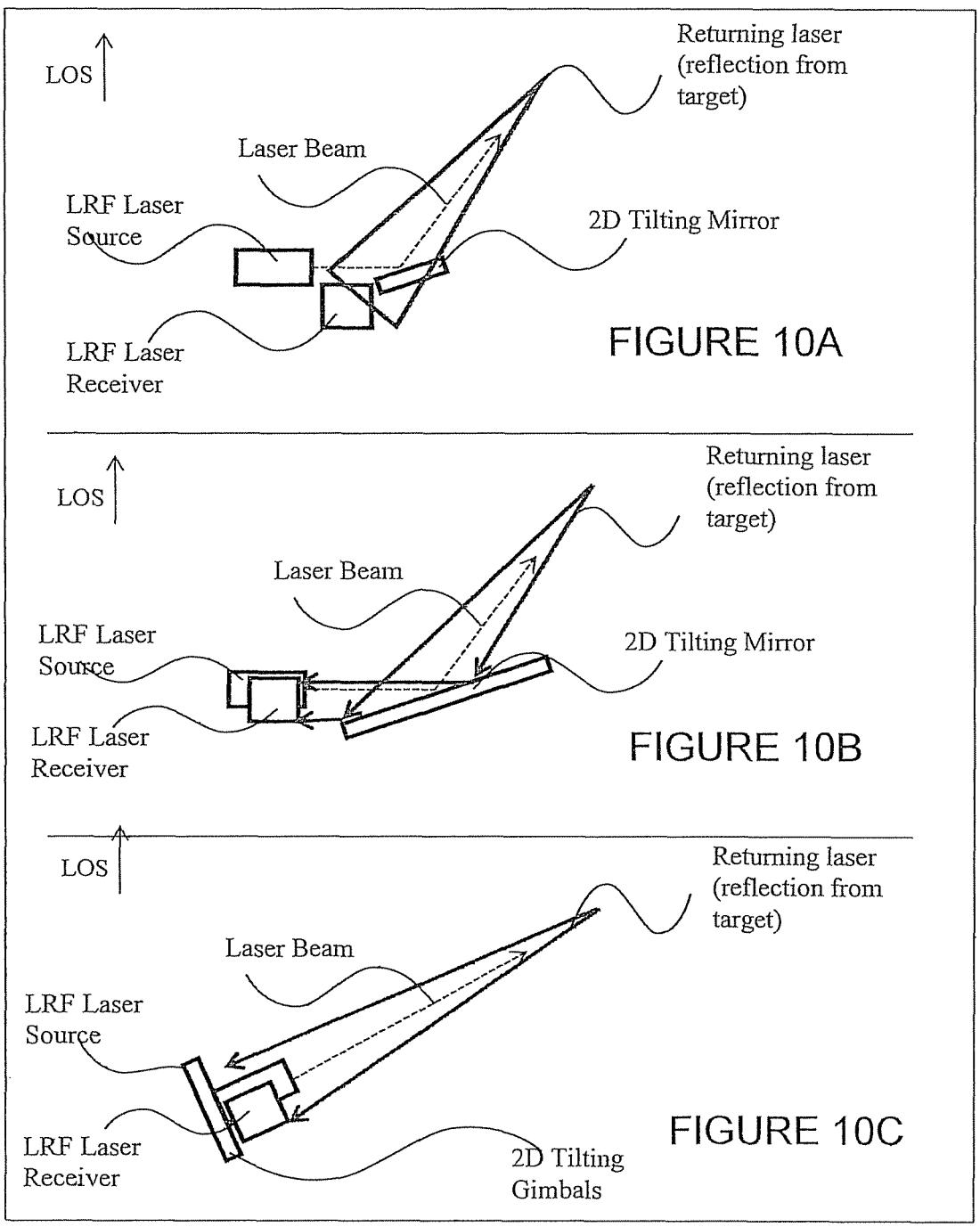

FIREARM AIMING SYSTEM WITH RANGE FINDER, AND METHOD OF ACQUIRING A TARGET

FIELD OF THE INVENTION

The present invention relates to firearms, in particular an aiming system therefor.

BACKGROUND OF THE INVENTION

Firearms have a low effectiveness for a number of reasons, even in the case where a high quality firearm is used. Some of the problems include movement (shaking) by the user (the main issue); movement of the target (e.g. a live target such as a combatant or criminal); relative aiming—such as the range to the target and inclination angle (ballistics), dynamic issues of the firearm (e.g. heating up of the barrel during use); atmospheric/ambient conditions (e.g. wind, fog, elevation, etc); and visualization of the target (i.e. the target may be temporarily hidden and not in a line of sight position for aiming). On the police force, it is common that most firing results in a miss; and in combat, the vast majority of firing results in a miss. Furthermore, there are also frequent issues with friendly soldiers being killed or wounded by so called "friendly fire".

At least some of the aforementioned issues are addressed in US 2006/005,447 "Processor aided firing of small arms" (Lenner et al); EP 0,605,290 "Optronic shooting aid device for hand weapon and its application to progress in a hostile environment" (Fertala); and U.S. Pat. No. 5,822,713 "Guided fire control system" (Profeta).

US 2006/005,447 discloses a weapon comprising: a firearm having a barrel and a user interface; a barrel oscillator for oscillating the barrel in a predetermined pattern; an image capture device mounted on the firearm for capturing a plurality of image (video) frames of a target and generating image data in response thereto; at least one barrel motion sensor mounted on the firearm for sensing a motion of the barrel and generating motion data in response thereto; and a processor coupled to: the user interface, the image capture device and the at least one barrel motion sensor. The processor enables a user to select a target by freezing one of the video frames, selecting the target, thereby causing the image capture device to capture the plurality of images and generate the image data which is used along with the motion data to determine a predicted target location and coverage point where the barrel covers the target upon which the processor may energize the firearm to fire a projectile. The firearm requires at least one barrel motion sensor in the case of non-static targets.

EP 0,605,290 relates to the field of aids for shooting a hand weapon, and is based on a wide field/narrow field coupling for target recognition and marking, combined with automatic target tracking and conditional triggering of shooting. The helmet of an infantryman is equipped with a wide-field sensor, the output signal from which is applied to a monitor integrated into the helmet. The weapon of the infantryman is equipped with an optical system with a narrow-field sensor coupled to a tracker and multiple control means. The multiple control means controls a video change-over switch that applies the imagery signal originating either from the wide-field sensor or from the narrow-field sensor to the monitor), the tracker for acquiring a target and a comparator for triggering firing means when the coordinates of the target, calculated by an angular deviation measurement device are equal to those of a predetermined reference.

U.S. Pat. No. 5,822,713 discloses a fire control system comprising a manually aimed gun having a sighting device and a device for acquiring a target. The target acquiring device (e.g. infrared imaging device or FLIR device) is disposed at a location remote from the gun. The fire control system also comprises a device for determining the trajectory of the target with respect to the gun and providing information relating to the target to the sighting device of the gun such that an operator of the gun can aim the gun with respect to the sighting device to hit the target when the gun is fired. The determining device is in communication with the target acquiring device and the sighting device. Profeta also discloses a fire control method for a minor caliber gun comprising the steps of acquiring a target from a location which is remote from the gun; determining the trajectory of the target with respect to the gun; providing information relating to the target to a sighting device of the gun; and manually aiming the gun in accordance with the information appearing on the sighting device such that the gun is aimed to accurately hit the target when fired. However, the remote targeting device makes verification of possible line of sight firing questionable.

Other related publications include: US 2006/201,047 "Rifle scope with image stabilization" (Lowrey); U.S. Pat. No. 7,421,816 "Weapon sight" (Conescu); U.S. Pat. No. 7,089,845 "Aiming a weapon barrel" (Firedli); WO 98/051,987 "Video sighting unit for rifles" (Becker); US 2008/039962 "Firearm system for data acquisition and control" (McRae); U.S. Pat. No. 3,659,494 "Fire control system for use in conjunction with electronic image motion stabilization systems" (Philbrick et al); and U.S. Pat. No. 5,392,688 "Trigger for a firing weapon" (Boutet et al).

SUMMARY OF THE INVENTION

The present invention relates to a firearm comprising an aiming system for improved firing efficiency or effectiveness and method of operating same. The firearm is typically hand-held or at least man-aimed.

In accordance with embodiments of one aspect of the present invention there is provided a firearm aiming system.

In the specification and claims, the term "firearm" will be understood to mean a personal, man-aimed or hand-held firearm designed for aiming and firing by a single user, including pistols; rifles; machine guns; grenade launchers; hand-held rocket, and the like, including combinations thereof, for example an M-16 and M-203 combination.

The aiming system can be implemented as a retro-fit to an existing firearm, or "built-in" to a new firearm.

In accordance with embodiments of another aspect of the present invention there is provided a personal firearm comprising the above-defined aiming system.

In accordance with embodiments of yet another aspect of the present invention there is provided a method of operating a firearm as defined in claim 27 and claims depending therefrom.

In accordance with embodiments of yet another aspect of the present invention there is provided a method of reducing the probability of missing a target as defined in claim 33 and claims depending therefrom.

In some embodiments, the firearm can be disposed on top of a platform, implemented as a remote-controlled-non-stabilized firearm, robot or UAV which locks on a target from remote location via a video and a robot fires if target will be hit.

In some embodiments, the imaging and processing system can be implemented in a hand-held Laser Range Finder (LRF) for accurate measurement of the range of a target, which can be implemented in binoculars with LRF also for target acquisition—and not necessarily in a weapon. For example, the LRF will measure distance (target range) when cross hairs of the binoculars are on the locked target, thus allowing an accurate range to be measured. In some embodiments, this target measurement implementation further comprises a GPS, a digital compass and an inclinometer for dynamic target location extraction, which in addition to having the capability of measuring the range of a static target, can track a moving target and continually update the coordinates.

In some embodiments, the firing processor is adapted so that the epsilon tolerance or logic module uses predetermined settings, whereas in other embodiments the epsilon tolerance or logic module uses factors, i.e. the precision tolerance is dynamic, affected by factors in the field (discussed below) which affect the epsilon algorithms.

In regard to background movement, it is a particular feature of the present invention that the imaging system is adapted to determine the movement of a potential target based on movement relative to one or more static background features (e.g. objects or structures, such as a building, rock, tree or the like) in an imaged field. In such case, the firearm need not include a barrel motion sensor, and the one or more static features ("anchor" features) can be used to determine movement and angular velocity of the target, which, provides "lead" data for use by the processor's firing algorithm. Further, the static background features can be used for determining the barrel movement. A non-limiting list of exemplary barrel motion sensors include: gyroscope and compass based sensors, inclinometers and accelerometers. In some embodiments, the imaging system is adapted to determine the movement of a potential target based on movement relative to one or more dynamic background features.

According to related features, the imaging system is also adapted to determine the movement of a potential target while the user is moving. In such case, the static background object(s) seem to move, and typically at different velocities and/or directions in the field of view and background tracking is challenging. The imaging system can be adapted to include a feature termed "optic flow" analysis, which is capable of calculating the velocity of a dynamic target that is not part of the optic flow pattern, and relates to the situation where targets/objects at different ranges seems to move in different velocities and/or directions.

Another feature for calculating the movement/velocity of target(s) and/or self-movement that can be incorporated into the imaging system is a feature termed "multiple triangulations", which is often used in naval navigation.

Some embodiments include an image-based processing target range estimation function, which may be in default settings in the imaging and processor system. Along with other factors such as target movement and barrel movement, range estimation is one of the more important inputs to the epsilon logic module, as well as an important input to the firing computer and target lead calculations. One range estimation scenario involves using familiar or expected target size as a function of range. In other words, the larger the target (i.e. the greater the number of pixels present in the display), the shorter the range, and vice versa. This scenario can be advantageously combined with target recognition. For example, if the target is identified, it can be compared to the expected size of such a target. Thus, say the target is determined to be a human or tank, based on ATR (automatic target recognition), the target image size (i.e. number of pixels present in the display) can be compared to the known size of a typical human or tank in order to estimate the range. A further range estimation method usable in the instant aiming method is perspective analysis and/or focus.

Face detection/face recognition: In some embodiments, the target recognition is constituted by face detection—a method of detecting human targets. It may also be used to locate the human target's body, as the body is commonly located below the detected face. Face recognition can be used in specific situations, as follows:

(a) Automatically re-acquiring a target (e.g. a target that went out of the FOV and re-entered; a target that crossed another target; or a target that was behind a cover such as re-appearing in a window;

(b) Absolute identification—friend and foe identification such as in a hostages/kidnapper scenario (e.g. using pre-loaded facial images to mark as "friend" or "foe" in the specific scenario, and/or specifying a person in the scenario, such as "the leader"; and (c) Enabling sending an image of the detected person to others, including other users in the field and/or a commander/headquarters—typically including receiving information back about the person and/or a command.

Another range estimation scenario uses the target speed, as the more quickly the target moves across the display, the more likely the target is to be close, and vice versa. Again, this scenario can be advantageously combined with target recognition. For example, if the target is identified, the actual movement/velocity of the target can be compared to the known typical range of velocity of such target.

Another range estimation scenario uses relative location of the target—i.e. the imaging sensor determines the target location with respect to a background feature (whose distance the processor can determine by any LRF process or estimation of known object size), in other words if the target is in front (or in front of an imaginary horizontal line in the field), behind, above, or below a background feature (which need not be static) having a known or estimated range.

In some embodiments, a range measurement is performed using an LRF, automatically initiated at the moment of locking onto the target. However, sometimes a shooter does not want to use an LRF to avoid the possibility of revealing his position. For such purpose, in some embodiments, the firearm uses one of: (1) a predetermined range (set by the user or by a system default); (2) an image processing based range estimate (passive, as described herein); (3) an auto-LRF measurement, only after a shot is fired (at which point, the shooter's position is revealed in any event); or (4) a manual laser command, i.e. a laser beam will be emitted only after the aiming system determines the correct time to activate the laser beam.

It is a particular feature of some embodiments of the invention that the firearm is adapted to highlight and track multiple targets simultaneously, thereby facilitating firing at a plurality of targets without requiring locking on to each target between firing rounds. In some embodiments, the user can lock on an object/potential target even if the imaging system has not provided a highlighting.

Advantages of the present invention include that it: enables accurate firing under various conditions (e.g. even at long range; or after physical effort by the user such as heavy breathing; or while the user is moving, such as on the run or from a land vehicle or helicopter; while the target is moving); minimizes civilian and friendly forces casualties; reduces collateral damage; improves the safety and effectiveness of combat and training; can help firing at specific body parts (e.g. lethal or non-lethal firing); can help firing at specific parts (e.g. the wheel of a vehicle); can document a shooting episode to determine if the firing was proper; helps training or operation debriefing; and saves ammunition. Furthermore, the present invention can accomplish the aforementioned advantages without the need for barrel motion sensors.

Additionally, according to the present invention there is provided an aiming system, for an aimable device, including: (a) a user display; (b) an imaging system that is adapted to display, on the user display, an indicator of a direction in which the device is pointing; (c) user controls for locking on a target towards which the device is pointing according to the indicator; (d) a tracker for tracking the target subsequent to the locking on the target by said user controls; and (e) a range finder for measuring a range to the target as the target is tracked by the tracker.

There also is provided, according to the present invention, a method of acquiring a target, including the steps of: (a) aiming an aimable device that includes: (i) a user display, (ii) a tracker, and (iii) a range finder, so that an indicator, in the user display, that indicates a direction in which the device is pointing, is superposed on the target; (b) locking the tracker on the target; (c) using the tracker to aim the range finder at the target; and (d) measuring a range to the target, using the range finder.

Another aiming system of the present invention is not just for a firearm, but for any aimable device, i.e., any hand-held or tripod-mounted device, such as a camera or binoculars, that is intended to be aimed at a target. A basic such aiming system includes a user display, an imaging system, user controls, a tracker and a range finder. The imaging system is adapted to display, on the user display, an indicator of a direction in which the device is pointing. The user controls are for locking on a target towards which the device is pointing according to the indicator. Following the locking on the target by the user controls, the tracker tracks the target. The range finder, which may include e.g. a LRF or a source of structured light, measures a range to the target as the target is tracked by the tracker.

In one LRF-based embodiment, the LRF includes a laser, a mirror that is controlled by the tracker so as to reflect light (typically light pulses because the LRF measures range by measuring time-of-flight of pulses to and from the target) from the laser toward the target, and a receiver of the light as reflected from the target. In another LRF-based embodiment, the LRF includes a laser, a receiver, and a gimbal that is controlled by the tracker so as to point the laser and the receiver towards the target so that light from the laser that is reflected from the target is received by the receiver.

In the LRF-based embodiments, the tracker could be operative to just aim the range finder at the target (e.g. as in FIG. 11A below), or to scan the target with the LRF to measure both the range to the target and the range to the background of the target. FIG. 11B below illustrates an example of a one-dimensional scan. FIG. 11C below illustrates an example of a two-dimensional scan.

The user controls could be adapted to allow locking on the target either automatically or manually.

Preferably the user controls include a target lock-on mechanism that includes a trigger, a button and/or a touch screen.

Preferably, the imaging system is adapted to detect the target based on target features. Most preferably, the imaging system detects the target via edge detection. Also most preferably, the imaging system highlights the target on the user display. Preferred target features include target movement, target shape, a muzzle flash associated with the target, the range to the target, the IR signature of the target, and "change detection" as defined below.

In an associated method of acquiring a target, an aimable device that includes a user display, a tracker and a range finder is aimed at the target so that an indicator, in the user display, that indicates the direction in which the device is pointing, is superposed on the target. The tracker is locked on the target and is used to aim the range finder at the target. The range finder then is used to measure the range to the target. Preferably, geographic coordinates of the target are computed based on the measured range, and are transmitted to a remote location.

BRIEF DESCRIPTION OF THE DRAWINGS

The present invention will be understood and appreciated more fully from the following detailed description taken in conjunction with the appended drawings in which:

FIGS. 10A-10C illustrate three different embodiments of a range finder that is so aimed;

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DESCRIPTION OF EMBODIMENTS OF THE INVENTION

Illustrative embodiments of the invention are described below. In the interest of clarity, not all features/components of an actual implementation are necessarily described.

Figure 1:
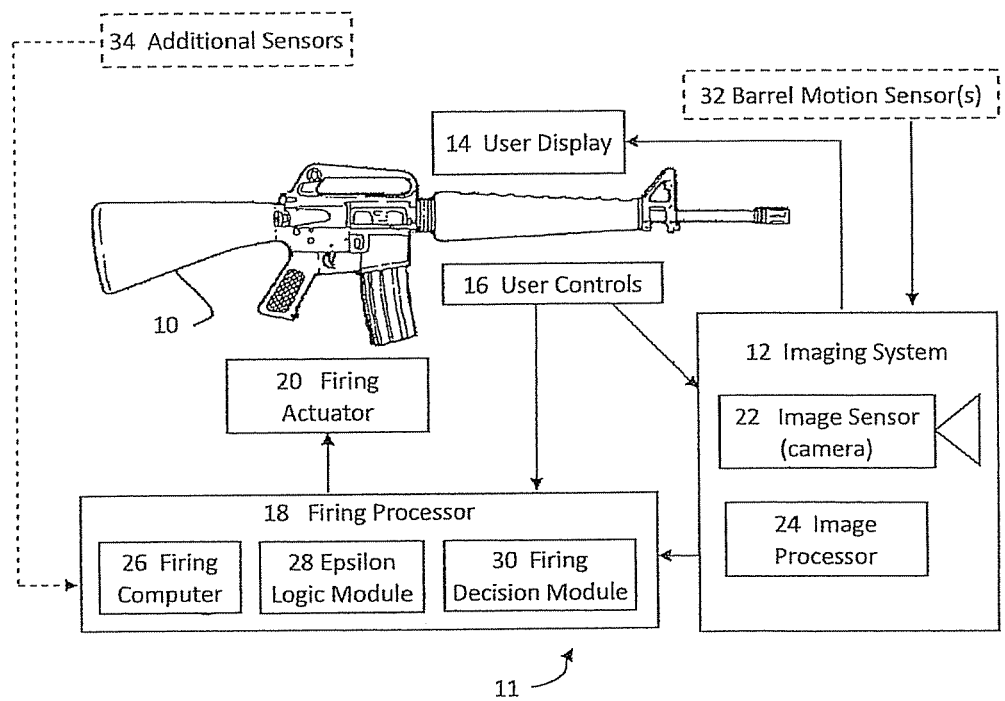
FIG. 1 is a schematic depicting an aiming system in accordance with some embodiments of the present invention.

FIG. 1 shows an embodiment of a firearm 10 in schematic depiction comprising a firearm aiming system 11, the system adapted to allow the user to lock onto a target, or a plurality of targets and only allow firing if the aiming system determines the target will be hit. For such purpose the aiming system 11 comprises an imaging system 12; a user display 14; user controls 16, for locking/unlocking onto the target or targets; a firing processor 18 (described in more detail with respect to FIG. 2); and a firing actuator 20 to effect firing. Firing actuator 20 can be mechanical, electrical or electro-mechanical and enables or disables firing when the firearm's trigger is pressed or electronic firing means are used. However, typically aiming system 11 will include an override capability to allow "unhindered" (regular) firing. In this regard, according to some embodiments, the firearm's aiming system can be adapted to work as a "regular" firearm, able to shoot mechanically, for example if the aiming system's batteries are too weak or there is a malfunction.

By-pass mode: In an embodiment related to the aforementioned override capability, aiming system 11 can include a bypass type override. In other words, wherein conditional firing is a mode selectable by the user. This mode or feature can be by actuated by applying more trigger force, by trigger press speed (rapid trigger press rather than a half-press and then full press) or by range (firing will be enabled in any event toward short-range targets, whether locked on or not.

Imaging system 12 includes an image sensor or camera 22 and an image processor 24. Camera 22 can be a day/night video camera, for example a charge-coupled device (CCD) or CMOS; forward looking infra-red sensor (FUR); multispectral or hyper-spectral camera, or any other sensor that enables tracking of a target location in their field of view (FOV) including combinations thereof. In this regard, imaging system 12 may "fuse" data from more than one sensor into one or more representations or use the different inputs in parallel.

User display 14 typically includes an image display for displaying video of a field view, cross hairs, virtual images (e.g. night display, IR image) and other features of aiming system 11 that will be discussed in more detail herein, such as aiming guides (FIG. 4), a tolerance indicator, and markers/highlighting. However in some embodiments, user display 14 can have an audio input/output and/or touch screen type capability, and the like. In some embodiments, user display 14 only displays markers on top of see-through optics.

User controls 16 typically include a lock/unlock mechanism to lock on, or unlock aiming system 11 from a target. The lock/unlock mechanism can be activated, for example, by a partial depress of the trigger, which optionally may require a trigger-depress dwell time—e.g., a fast press allows regular shooting and a half press followed by a full press will actuate aiming system 11. User controls 16 also typically include a lock update mechanism to update (adjust) the lock on position (location in the target area that aiming system 11 is locked onto). These mechanisms can be by way of any appropriate means, for example, a 4-way button, 5-way button, etc, or miniature joystick, as is known. User controls 16 can optionally have capability for inputting information such as target range, wind speed/direction, and other such data. However, inputs such as wind speed and target range, etc, can be estimated or measured by aiming system 11. As will be further detailed herein, the use of specific techniques for estimating target range is a particular feature of the firearm 10 and aiming system 11.

Although it is a particular feature of some embodiments of the firearm's aiming system 11 that it need not include barrel motion sensors, rather the system can use background features to calculate/predict both the movement of the target and of the barrel of the firearm 10 (as will be described in more detail below), the aiming system can none-the-less include barrel motion sensors 32 to help calculate and predict the position of the barrel and movement of the user, e.g. shaking while aiming. In particular, it is the use of background features in the FOV that facilitate barrel movement calculations and predictions in embodiments that do not include barrel motion sensors 32. To emphasize this, the barrel motion sensor(s) block is shown in dashed lines, as is the block for additional sensors 34.

Further, in some embodiments aiming system 11 can include additional sensors 34, such as the following components: microphone; inclinometer; accelerometer/inertial sensor; compass; GPS, Laser Range Finder (LRF), temperature measurement device (e.g. thermometer, thermocouple); barometer; wind-meter; and other like. Such components can be added to aiming system 11 to improve the accuracy and compensate for environmental factors that affect firing accuracy; to provide intelligence, e.g. a geospatial information system (GIS) and GIS data base, which may include capability for determining user location and user location with respect to friendly and unfriendly forces; and for event recording purposes.

Firing processor 18 of aiming system 11 comprises a firing computer 26; in preferred embodiments, an epsilon logic module 28; and a firing decision module 30. A firing computer is a typical component on sophisticated aiming systems and performs activities such as calculating the adjusted aimpoint to the required range, wind, inclining angle etc; and typically uses ballistics tables and/or equations of the specific firearm and rounds. Firing decision module 30 is responsible for taking input from other systems/modules/processors and predicting whether the target can be hit. In preferred embodiments, this prediction, or more precisely the actual hit, is aided by use of a target area, called an "epsilon tolerance area" (or derivations of this term), as is discussed in more detail herein.

Figure 2:
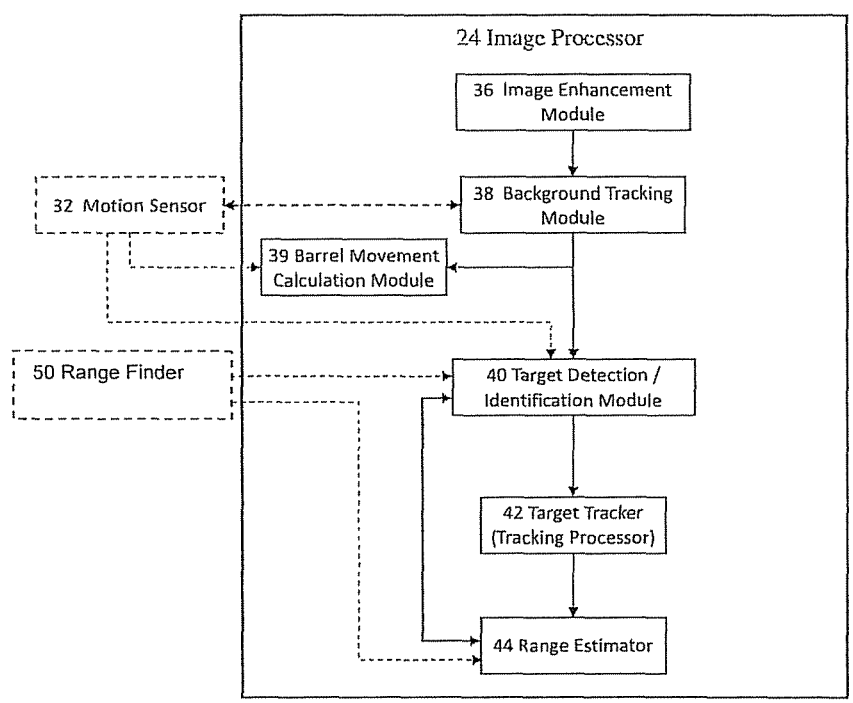
FIG. 2 is a diagrammatical depiction illustrating embodiments of an imaging processor of the present aiming system.

FIG. 2 provides the structure of an exemplary image processor 24 including an image enhancement module 36; background tracking module 38; barrel movement calculation module 39 (it should be noted that it is a particular feature of the present invention that barrel movement can be determined via background features without the need for a barrel movement or barrel motion sensors); target detection/identification module 40; target tracker (tracking processor) 42; and range estimator 44. Regardless, in some embodiments, image processor 24 does not include one or more of: background tracking module 38; barrel movement calculation module 39; and range estimator 44, as these components are not absolutely required in most scenarios. Image enhancement module 36 is responsible for enhancing the raw image by any known means such as by gain control and/or super-resolution techniques.

According to some embodiments, image processor 24 may automatically detect features in the FOV (which may be one or more potential targets) based on predetermined/automatic settings (e.g. if a potential target is moving; looks like a human or a tank, etc), in which case the image processor highlights the target (e.g. by contour/outline or color) based on edge differential between the potential target and its surrounding/background or other means. The user can then choose the detected potential target by selecting the target (by pointing at and locking on the potential target or its "area" (such as a target lockable area 56, as will be explained in more detail with reference to FIG. 5). This area is usually bigger than the actual target boundaries—making the target "bigger" and easier to select. Or the user can continue to scan the field provided by image sensor 22. In some embodiments, the target or its target area can be selected if the barrel is at least pointed near to the target/target area; and typically after that the lock-on will be "snapped" to the center of the target or other such pre-determined location. Selecting the target area can be considered "locking" onto a point on (location within or nearby) the target on which firearm 10 is directed at that moment. In some preferred embodiments, there is a target lock-on option whereby the locked-on point is moved to a central location in the highlighted target image; or the locked-on point can be moved to another location by the user (i.e. the locked-on point can be updated). In some embodiments, the system includes ATR whereby the target is recognized and the locked-on point is moved to a chosen or predetermined location of the target (e.g. the wheel of a vehicle; legs of a combatant; and so on). In some embodiments, the system is adapted to allow parts of the target to be selected by the user. In some options of this embodiment, an ATR feature of imaging system 12 can suggest target parts to the user.

Figure 3:
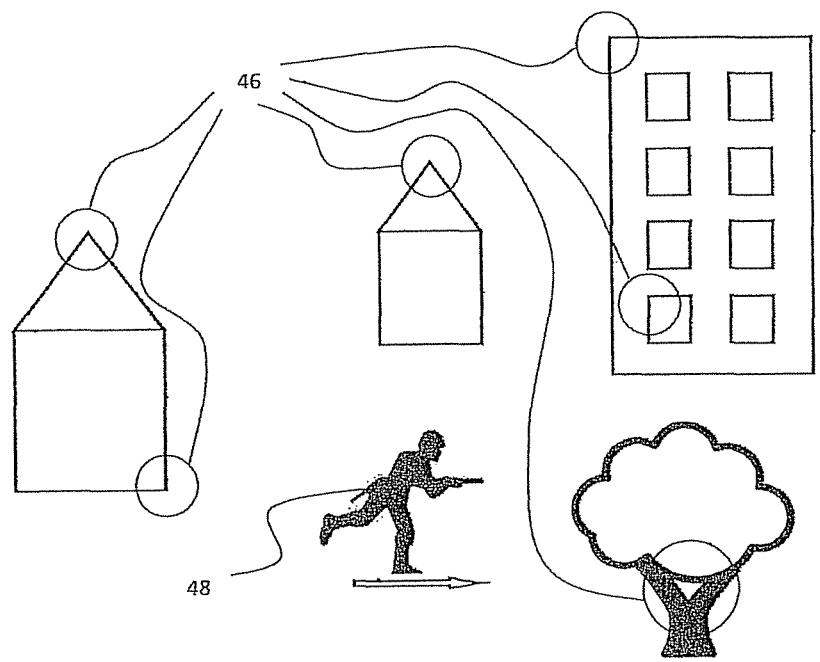
FIG. 3 is a schematic exemplary Field of View (FOV) of the present imaging system.

With reference to FIG. 3 as well, background tracking module 38 can identify a single, or more preferably a group of, static background features 46 in the FOV, for example a house, building and tree as illustrated. These static features 46 identified by background tracking module 38 enable a series of particularly important calculations for aiming system 11. First of all, using static features 46, background tracking module 38 can determine the relative movement of a target or a locked-on target 48, whereby the velocity of target 48 can be calculated—importantly, without the need for barrel motion sensor(s) 32. In addition, also using static features 46, barrel movement is calculated via barrel movement calculation module 39—both angular and translational movement. In some embodiments, as a part of the aforementioned calculations, background tracking module 38 can perform FOV background stabilization. It is another important feature of the present invention that the target lead can be calculated without the need for any barrel motion sensor(s), rather using static background features 46 determined by background tracking module 38. Background tracking module 38 provides the position of static background features 46 to barrel movement calculation module 39 so that the movement (and aiming; i.e. direction), of the barrel can be calculated, and extrapolated, with respect to the position of locked-on target 48, by comparison to those static features. The position of locked-on target 48 is also extrapolated, i.e. the lead is calculated, as discussed herein. Again, if the aiming system 11 includes barrel motion sensor(s) 32, background tracking module 38 can use information from the barrel motion sensor(s) to calculate barrel position/aiming.

It is also an important feature of the invention that in embodiments that include barrel motion sensor(s) 32, the background tracking module 38 enables zeroing of "walk" (barrel motion sensors tend to drift over time), whether the target 48 is static or dynamic. The aiming system 11 can "zero" or calibrate itself with respect to the one or more static features 46, not merely with respect to target 48—there is no need to even have a locked on target. Thus, target lead can be calculated by the calculated target movement using static features 46 (and/or using barrel motion sensor(s) 32, if included); in concert with range estimation, ballistics, etc, by firing computer 26.

Calibration Mode: In some embodiments, the system is adapted to allow automatic calibration, e.g., shooting toward a calibration target whereby the system identifies the hit location and calibrates itself automatically so that the expected hit location coincides with the actual hit location; or per another option the user identifies the hit location and marks the hit location so the calibration can be performed. Imaging system 12 can zoom in if it is difficult for the imaging system to see the hit location.

In other embodiments, the system is adapted for battle calibration—shooting toward any target (at a measured/known range), freezing the image of the shooting, and marking (automatically or manually) the hit location. The system auto-calibrates itself accordingly.

Reverting to FIG. 2, it is a particular feature of target detection/identification module 40 that the module can identify a potential target based on movement, as any movement of a feature in the FOV is a good indication of a potential target wherein the identification of movement of the potential target is performed using comparison of the tracked static background features 46. Other target detection techniques can also be used, for example, FLIR, ATR, muzzle flash, acoustic techniques, detection by remote systems, "change detection", and so on.

By the term "change detection" it is meant the comparison to a recorded database. For example the present imaging system 12 can be used to record a video of an area (scan a potential battle field) for instance; or another video recorder is used and data from that video recorder is downloaded to imaging system 12. Upon return to the same area, the difference or change between the two scenes can provide information for detecting potential hazards, which are highlighted in user display 14. Such change detection mode typically requires components such as a GPS, compass and inclinometer; and an image comparator.

Target detection/identification module 40 also highlights potential targets for user selection (locking on). This typically occurs while the user is scanning the FOV and results in a highlighting of the potential target (e.g. by a contour/outline, color, etc) using background-target segregation techniques such as edge detection, movement detection and so on. It is an important feature of the invention that the selection of targets can be made from a live video by aiming firearm 10 toward the target area; there is no need to freeze frames and then select the target. Thus, a rapid target selection can be made.

In some embodiments, the highlighting can occur even if firearm 10 is not pointing directly at a potential target, rather merely due to movement of that potential target, which commonly indicates that the potential target is a good choice. Imaging system 12 will detect the target movement and will highlight that target, and, in some embodiments, cause an automatic lock on, in accordance with pre-programming of the system or user choice. In some embodiments, aiming system 11 is adapted to indicate a hierarchy of desired targets—for example a close-by moving target is "ranked" higher (essentially meaning a more desired and/or dangerous target) than a far away moving target, which is ranked higher than a static target; a particular human/enemy higher than others; and the aiming system is thus typically adapted to provide an indication (symbol, color, flashing, etc). Accordingly, aiming system 11 has an algorithm capable of indicating a preference for selecting (highlighting and in some cases automatically locking on to) particular potential targets.

With regard to identification of targets using movement, in some embodiments, aiming system 11 uses movement information of potential targets in the FOV for target identification. For example, the speed of a potential target can help identify it, e.g. a target moving faster than humans are able can indicate the entity is a motorized vehicle. Reiterating, it is a particular feature of the present invention that target movement, including velocity, can be determined using static features, therefore not requiring barrel motion sensor(s) 32, thus, according to some embodiments, static features can be used to help identify a moving target and facilitate highlighting and automatic lock on.

In some embodiments, the target tracker 42 of the image processor 24 is adapted so that after the user selects a target by locking on it, using user controls 16, the user can then update the lock location (e.g. using a 4-way button, joystick or trackball). This embodiment can be considered a manual modification or alternative to (or used in combination with) embodiments where after the lock-on step, the firearm (i.e. imaging system 12) will automatically move the locked location to the center of the target, or another predetermined location. The 4-way button may enable selecting different targets (e.g. nearby target, one terrorist over another) or a different part/portion of the same target such as the target's legs instead of torso or head.

The term "another predetermined location", can refer to, for example, if the target is human, the "center of the target" may be chosen as the center of the chest, rather than the geometric center. It should be noted that the term "center" can be understood to mean a (typically small) area or actively, selection of an area. Typically, to determine if the target is human, the imaging processor 24 will require ATR or face detection. In this regard, aiming system 11 can be adapted to include a data base of shapes, objects, models, people and so on in order to make a reasonable determination of several common potential targets.

User controls 16 can also be adapted to allow selection of an alternate target, selecting a specific part of the target or affecting the size of the epsilon (target/tolerance) area.

Tracker 42 is typically an electro-optic tracker. Tracker 42 receives the image of one or more locked-on targets from image sensor 22 after detection by target detection/identification module 40, and tracks the target(s). This tracking can continue even outside the FOV of the user display 14 which is still in the FOV of the image sensor; however, in some embodiments, the tracking can extrapolate the expected movement of the target and pick up the target again when it re-enters the FOV of the image sensor (for example: a combatant who moves outside the FOV of the image sensor, or temporarily moves behind a blocking object). In some embodiments, imaging system 12 is adapted to include the capability of "receiving" an otherwise unseen target identified by another firearm, for example, from the aiming system of another soldier who does see the target. In some embodiments, imaging system 12 is adapted to include the capability of tracking a "ghost" image (target), for example an enemy hiding behind a wall, who is "visible" using another sensor Whole Scene Tracking: in accordance with some embodiments, aiming system 11 is adapted to identify any object's movement in the FOV and track some or all objects. The user may, but may not need to know about this tracking, but this tracking may be used to:

(a) Manage high level target tracking (i.e. store in memory all object locations and movements) for expecting and identifying target crossing, etc;

(b) Enable better detection of a (formerly) moving target that has stopped;

(c) Change the safety level (by reducing the epsilon area for example)—to avoid hitting other moving objects or friendly forces nearby;

(d) Enable selection of moving targets by matching the barrel movement to the target movement (for example, selecting the nearest target that moves in the same direction of the barrel) and to avoid selecting a target crossing that nearest target;

(e) Enable range estimation relative to other static or dynamic objects with known range (measured/calculated or estimated);

In some embodiments, aiming system 11 includes a range finder 50 such as a laser range finder (LRF) which can be used to add information to the target detection/identification module 40, in particular the identification aspect thereof providing expectation of object sizes.

Target tracker 42 of image processor 24 receives information from background tracking module 38 and target detection/identification module 40 (or barrel motion sensor(s) 32, if present) and tracks after the locked-on target 48 with respect to static features 46 (or barrel motion sensor(s) 32, if present).

Range estimator 44 "passively" estimates target range, i.e. without using range finder 50. Methods to estimate the target range include using familiar or expected target size as a function of range; target speed; relative location, focus (using lenses' optical focus to estimate the range etc, as noted above. Again, where aiming system 11 includes range finder 50, the range as measured by range finder 50 can be used.

The above information, whether estimated, measured or calculated by image processor 24 or via inputs thereto (which can be user inputs or inputs from the system's components, or other information inputs from additional sensors 34 and/or external information received through communication from another system or external command system), is passed on to firing processor 18, •in particular: (a) detected and locked-on target information such as: target location, target type (e.g. using ATR), target size, target shape, target velocity, target range; (b) barrel movement; and (c) nearby friendly forces, civilians, and the like.

Figure 4:
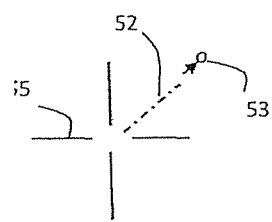
FIG. 4 is a view of an exemplary aiming aid for the present aiming system.

With reference to FIG. 4, in some embodiments, user display 14 comprises an aiming guide, illustrated by target location indicator or aiming arrow 52 pointing toward a preferred aim-point 53 of a locked-on target, (even if the target is outside the FOV of display 14). Preferred aim-point 53 can in essence be an epsilon area 54; detailed below. This aiming guide is an advantageous feature as the shooter knows how to adjust aim, i.e. so that the center of cross-hairs 55 can be moved along the aiming arrow 52 toward aim-point 53. Aim-point 53 may be a point within the target and/or a target area determined by epsilon logic module 28, which will now be detailed.

As mentioned above, in preferred embodiments, firing processor 18 includes epsilon logic module 28. Epsilon logic module 28 is responsible for calculating the target aim-point/area or epsilon area 54 (see FIGS. 5 and 6) of the target 48. It is this epsilon area 54 that is used by firing decision module 30 to make a firing decision. Prior art aiming systems have a predefined aiming accuracy requirement (e.g. a particular Minutes of Arc/Angle; MOA), which is not automatically calculated and has a predetermined shape (a point, circle, etc). In contrast, in some embodiments, the instant aiming system is adapted to calculate a dynamic epsilon area, and the size of the epsilon area is defined automatically such as by target's range, size, firearm and environmental conditions, firearm shaking, etc; and the shape of the epsilon area is defined automatically by the shape of the target.

The epsilon logic module 28 of the present invention is responsible for calculating the tolerance or inaccuracy that the system will allow, in this case, the firing or aiming tolerance. For explanation by way of example, firearm 10, or aiming system 11 thereof, may be locked on a location of target 48 (pixel of the image) and imaging system 12 and firing processor 18 will determine within what area around that location/pixel the firing will be allowed or actuated. In typical cases, after locking onto a point/pixel of target 48, imaging system 12 will adjust the lock-on point/location to a desirable (preferred) location, such as the center of target 48. In this regard, as a result of allowing either automatic or manual adjustment of the lock-on point, the aiming system 11 can allow locking onto a target even if the aim-point is merely near target 48 and does not require the aim-point to be on the target's physical/detected shape. An example of this "lock nearby" feature is illustrated by a dashed line defining a target lockable area 56 (FIG. 5) which is larger than the area of the actual target. As such, the term lock-on and its derivatives will be understood to denote on or nearby, in the specification and claims.

Figure 5:
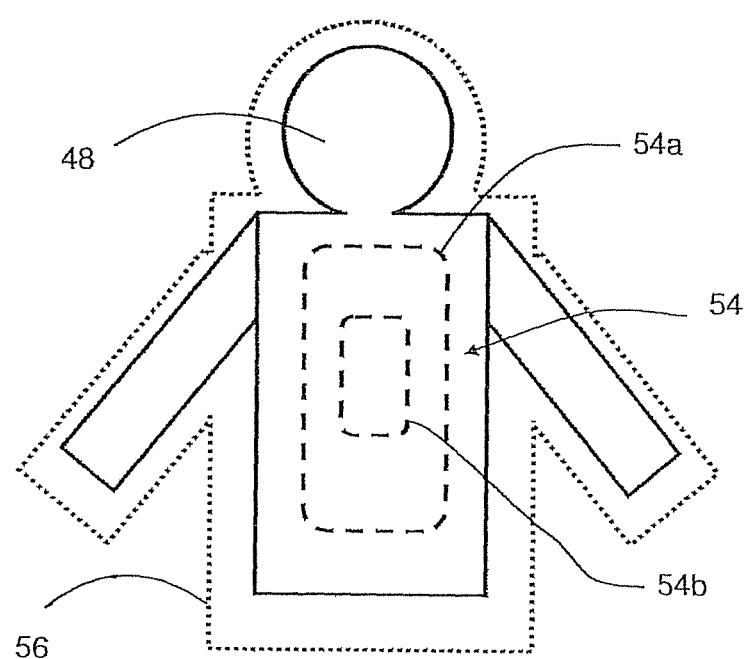
FIG. 5 is a schematic of an exemplary target illustrating firing tolerance in accordance with embodiments of the present aiming system.

FIG. 5 graphically illustrates an example of epsilon tolerance (area) via an upper body portion of target 48. Upon locking on target 48, the aiming system 11, primarily imaging system 12, uses information such as target range, etc, as noted above, to determine epsilon area 54 which may be a relatively large epsilon area 54a if conditions so warrant (e.g. there is little or no wind, the user is stable and the target range is short). On the other hand, with less favorable conditions, a relatively small epsilon area 54b may be calculated by epsilon logic module 28. In some embodiments, epsilon area 54 is predetermined or choosable by the user, rather than calculated.

The epsilon tolerance (area) can be calculated based on factors such as the range of the target; i.e. because the range of the target affects the probability of the firearm 10 being aimed to hit, the tolerance required (allowable area) for firing can be accordingly adjusted. Another exemplary factor is the target size, for example if the target is large a higher tolerance (area) may be required/allowed as the chance of the firearm being "on target" is greater. Another exemplary factor is the target type, which may be determined by the user or preferably entail imaging system 12 comprising a target recognition algorithm such as an automatic target recognition (ATR) algorithm, for identifying the target type. In an exemplary implementation, if the target is a person or animal, the algorithm may not consider arms and/or legs of the target, which are prone to quick movement and thus may prove more difficult to hit.

Another exemplary factor can be the movement of the target; i.e. if imaging system 12 determines the target is moving, especially if moving rapidly, the processing algorithm can adjust the required tolerance for firing and allow rapid firing to help increase the probability of a hit or decrease the probability of a miss. Another exemplary factor can be the stability of the user; i.e. if the user moves a lot (e.g. shakes) or moves quickly, typically based on barrel movement calculation, the epsilon tolerance (area) algorithm can adjust the required tolerance (allowed area) for firing and further, may allow multiple and rapid firing to help increase the probability of a hit or decrease the probability of a miss. On the other hand, if the user is stable, the processing algorithm can adjust the required tolerance (allowed area) for firing accordingly.

Another exemplary factor can be background movement; i.e. if there is more than one moving item. This can be a result of civilians or friendly forces and the epsilon tolerance can be adjusted accordingly to reduce the risk of hitting such non-targets. On the other hand, if there is no background movement, or it can be determined that the target is far from friendly forces, the processing system may allow a less strict tolerance.

In accordance with the aforementioned tolerance examples, it is a particular feature of the present invention that the percentage of the area (defined by an outline/contour of the target produced by imaging system 12 and displayed on user display 14) can be used to define the tolerance. The percentage of contour area is explainable by example, i.e. 100% means epsilon area 54 is the same size as the area of the target (contour area); 50% means that the epsilon logic determines that the epsilon area is half the size of the target for allowing firing at the target, 150% means that the epsilon logic allows firing at an area 50% larger than the target's actual area; this concept can be reworded by using a pixel count instead of area.

In some embodiments, the aforementioned factors can be overridden and the user can select the tolerance/accuracy to be implemented by the firearm.

Figure 6:
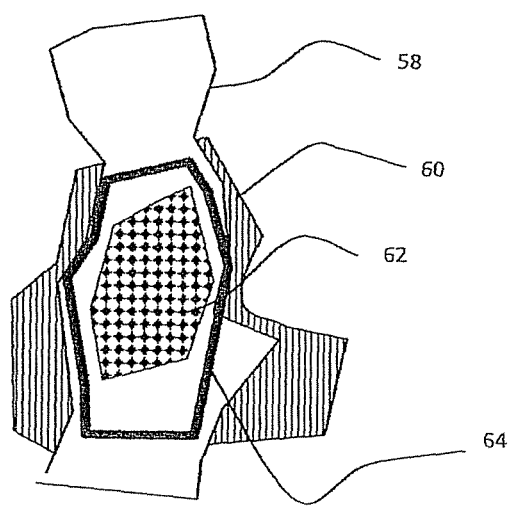
FIG. 6 is a schematic illustrating exemplary target aimpoint detection modes of the present aiming system.

FIG. 6 graphically illustrates exemplary potential target detection modes of aiming system 11. One mode of detecting a potential target is by detecting contours (outlines, edges), resulting in a contour based area 58; another is the use of movement detection, resulting in a movement detection based area 60; and another is the use of an IR radiation threshold, resulting in a an IR radiation threshold based area 62 (e.g. above a certain temperature an object will be considered a potential target). These target detection methods can be used separately or in combination (depending on the given design of the aiming system 11, i.e. components included) for detecting a potential target. The aforementioned detection can be used as input to epsilon (tolerance) logic module 28 and an exemplary graphical depiction of an effective target area is shown based on epsilon logic, i.e. an epsilon tolerance contour 64. The aforementioned detection is also an input to target tracker•42, which highlights potential targets for user selection (locking on). Additional exemplary target detect modes that can also be used alone or in combination include: common movement; ATR; connected components; enemy firing detection (e.g. muzzle flash, acoustic); friend or foe detection, etc. Imaging system 12 may display friendly forces (e.g. using IR flicker; via communication and a GPS, etc) or a restricted area (e.g. using a GIS) and block the firing on them.

In summary, aiming system 11 is generally designed to detect, highlight and track a target (e.g. via an electro-optical tracker), to determine if firearm 10 is aimed so that the target is expected/calculated to be hit, and to enable the firing if firing decision module 30 has determined that the target will be hit (or prevent/disable firing if the firing decision module determines the target will not be hit).

Firing decision module 30 uses input from imaging system 12 (e.g. target and barrel movement, range estimation or measurement, etc); firing computer 26; and epsilon logic module 28 to determine if the target is expected to be hit and thus whether to fire (or not). As a result of an affirmative firing decision, firing is actuated or enabled via firing actuator 20 (e.g. either by sending a signal in the case of an electronic firearm; or allowing the trigger to fire in a trigger-actuated firearm).

Reverting to FIG. 1, according to some embodiments, the aiming system 11 can be designed to include a mode adapted for firing at detected targets without the need to lock onto those targets—a "non-lock on mode". Here aiming system 11 does not require user display 14; target tracker 42; or epsilon logic module 28 as targets are selected automatically rather than, or in addition to, selection by the user; however, the use of the epsilon logic is typically preferable. This can be advantageous when the user wants to fire while moving, e.g. a soldier is charging, and it is difficult and/or inefficient to lock onto target(s). In this case, firing decision module 30 will allow firing only at "serious" or "suspicious" potential targets, for example based on movement of the target or temperature indicated by an IR sensor, ATR, muzzle flash or the like; however, not based on static edge detection. In addition to when a user is moving, this mode can also be advantageous in cases where an enemy fires from a window or behind a barrier and then hides. In this "non-lock on mode", the epsilon tolerance algorithm may be affected to increase the allowed target area as it is commonly useful to fire even if merely near the target. This mode does not prevent firing at locked on targets (locked on prior to or during this "non-lock on mode"), whether the locked on target was chosen by the user or remotely chosen.

Some embodiments of the invention include an enemy-suppressing fire mode ("suppress-fire" or "covering fire" mode)—firing to prevent/limit the enemy from firing/or moving, or to make them move and reveal themselves. This is a modified "non-lock mode" that allows firing every predetermined time period (typically hundreds of milli-seconds) if the trigger is pressed, even if no target or movement was identified. The time counting restarts if a shot was fired toward a real target, whether at a target locked on prior to invoking this mode or not. This embodiment enables use of detected targets without forfeiting the capability of producing suppressing fire.

Figure 7:
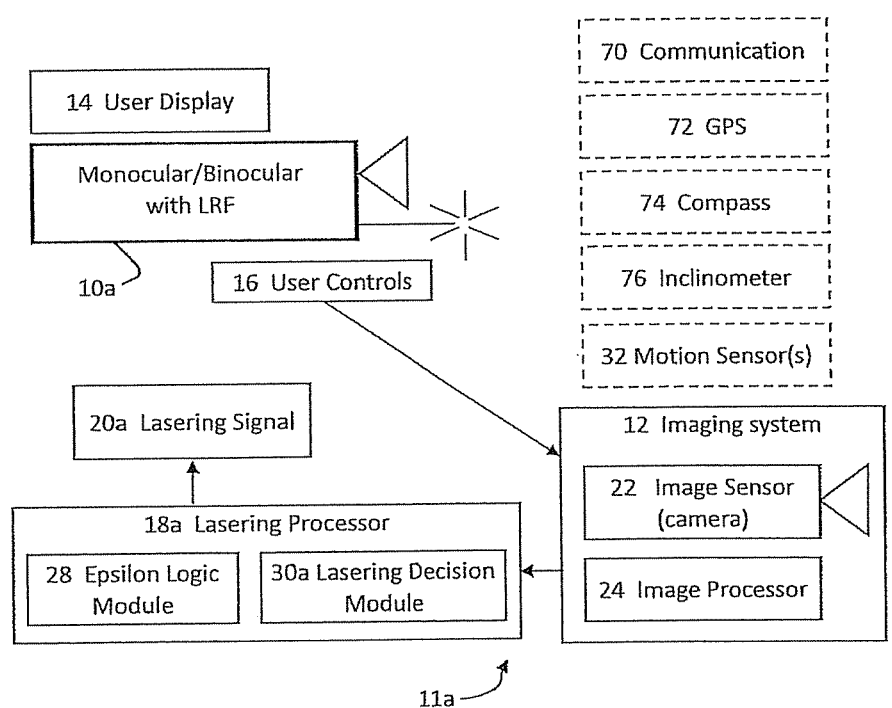
FIG. 7 is a schematic depicting an embodiment of the present aiming system for use in an alternate implementation.

FIG. 7 shows an alternate implementation of the present aiming system, as modified aiming system 11a, for use in a monocular or binoculars 10a having a range finding capability, such as via a LRF. In contrast to aiming system 11, system 11a passes information from imaging system 12 to a lasering processor 18a comprising epsilon logic module 28 and a lasering decision module 30a. Lasering processor 18a determines if the laser beam emitted by binoculars' LRF would impinge a desired target and so return an accurate range measurement, in which case a lasering signal 20a is allowed. This implementation is particularly convenient for a scout who wants to pass on target location information to a remote location, for example to communicate firing coordinates. For this purpose, additional components such as a communication system 70; GPS 72; compass 74; and inclinometer 76 can be included, which help measure the target location and communicate that information to another site.

In some embodiments, aiming system 11 is adapted to recognizing the actual hit location and hit time, for example by ricochet, dust or movement at a specific expected time and location. With recognition of hit location, an automatic calibration can be preformed based on comparison of expected versus actual hit location.

In some embodiments, aiming system 11 is adapted to recognize shooting of firearm 10, for example by light burst, specific noise and noise level, specific movement patterns of the firearm (fire shock), etc. In some embodiments, aiming system 11 is adapted to count shots/rounds. In some embodiments, image sensor 22 includes "blink sensors" at the time of shooting, i.e. wherein tracker 42 ignores video frames of image sensor 22, which could interrupt proper viewing of the field due to muzzle flash and abrupt movement of firearm. Thus, the activity of tracker 42 can be stopped for few milliseconds and resumed after the firing.

In some embodiments, aiming system 11 is adapted to recognize detect a laser marker (red dot), which may be an encoded laser, visible or not, from the firearm or a remote laser marker. The laser marker is displayed on user display 14 (for communication purposes between users or between the user and a remote person); and can automatically lock on the detected laser marker.

In some embodiments, aiming system 11 is adapted to record a video, collect data and statistics; and allow play back of the video recording.

In some embodiments, aiming system 11 is adapted to receive remotely detected locked-on targets (using the video of the image sensor 22), wherein a remote operator/user can select/lock on a target, then the shooter/user can shoot toward the remotely locked-on targets. This requires a communication means between the remote operator and aiming system 11].

In some embodiments, aiming system 11 is adapted to receive external/remote commands (again requiring a communication means), for example to stop firing. Such commands can preferably be overridden to allow shooting anyway if the need arises. This adaptation can be useful in an ambush, when firing is preferably synchronized.

In some embodiments, aiming system 11 is adapted to synchronize shooting on targets with other users. Such firing synchronization can be advantageous between users, such as snipers in a hostage scenario. For example, only when all of the snipers are aiming toward the locked on targets in a way that firing decision module 30 of firing processor 18 determines that all the snipers will hit their targets, will a fire authorization command be given, to all the snipers.

In some embodiments, firearm 10 with aiming system 11 can be adapted for training purposes, shooting blanks, or nothing at all, while aiming system 11 calculates the hits/misses Imaging system 12 may record the whole session or the "hit" moment image only. In another training example, aiming system 11 includes augmented reality targets (built-in trainer) and generates graphics (such as a running soldier) on user display 14. The computer generated target may be dynamic and it may determine the user's relative location, user actions—such as firing at the target; and it may simulate firing back at the trainee or getting hit. Aiming system 11 may calculate the hit/miss during training in the same way as it calculates for firing real rounds. This "training" mode can also be used to simulate real time firing before a firing command is actually given, letting the system calculate and snipers (users) be informed how many of the targets can actually be fired upon (hit) simultaneously, The training mode can also provide statistics of time to hit the target, success ratio estimation and so on, and all of which can be calculated and displayed to the users and potentially others such as commanders.

In some embodiments, aiming system 11 is adapted to use range measurement or estimation to: (a) Allow manual firing without any restrictions or allow firing toward short-range targets even if another target is locked-on (as a close target is usually more threatening than a remote target); (b) Block fire/alert regarding firing toward a target beyond effective range of the firearm; (c) Alert that charging toward the targets will be inefficient (as the target is long range, which is often wrongly estimated by soldiers, especially at night).

In some embodiments, aiming system 11 comprises multi- or hyper-spectral sensors. These sensors enable detection and/or identification and/or classification of specific targets (or friendly forces) for example: specific uniforms (e.g. by fabric). This feature can be used in logic for "reacquiring" the same target (having the same multi/hyper-spectral signature) after the target had been marked but had then left the system's FOV or went behind a cover and afterward reentered the FOV or came out from behind the cover etc.

Target selection by movement pattern: In some embodiments, aiming system 11 is adapted to allow target selection (lock-on) in accordance with movement pattern. It can be difficult to lock on to a moving target, especially if the user himself is moving. This embodiment enables a situation where by having a similar barrel movement pattern to the target movement (though the movement can be somewhat displaced, the target will be selectable (locked on). For example, a target moving to the right "tracked" by a general barrel movement in a similar rightward direction will enable selection of the target rather than a static target or target moving in a different direction. A similar mechanism may serve for deciding to shoot or not at the target with a similar movement pattern, even without locking on the target (such as in a "charge mode", where the user(s)/soldier(s) are charging toward target(s). For example, avoiding shooting at objects (such as humans) that are going in the other direction as the target, again, even if the target was not locked on, rather "selected" by the common pattern movement.

Second Bullet Mode: In some embodiments, aiming system 11 is adapted to start operating only after a first bullet is (or a number of bullets are) fired manually. The manual shooting provides the user's intention to the system and it may automatically (or with pressing a button) lock on the nearest plausible target (to the first shooting aim-point) that will enable a better chance to hit it.

Figure 8:
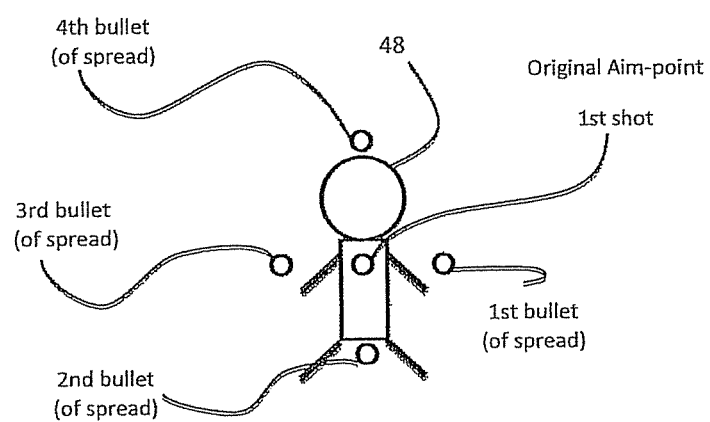
FIG. 8 is a schematic illustrating an embodiment of the present aiming system adapted for affecting a deliberate calculated bullet spread.

Deliberate-calculated-bullet-spread: FIG. 8 helps illustrate an embodiment wherein aiming system 11 is adapted to cause deliberate firing in a calculated spread (by moving the reticle in different directions about the target 48). By way of example, a first shot is fired toward target 48 and then there is a bullet spread, namely, a first bullet of the bullet spread fired below the target; followed by a $2^{nd}$ bullet of the bullet spread fired to the right of the target; followed by a $3^{rd}$ bullet of the bullet spread fired to the left of the target; followed by a $4^{th}$ bullet of the bullet spread fired above the target. The bullet spread is performed to improve the chance of hitting the target (although it increases the chance of missing the target as well). This embodiment/method can be very effective in cases of ballistic issues caused by wind calculation errors, range errors, calibration errors etc., and is particularly appropriate when hitting the target is more important than missing the target. The calculated spread can be better than a "random" spread by manual shooting. The order of the bullet spread can be "opportunistic", in other words if the user is aiming that way anyhow.

Virtual Laser Marker and Target Transference: In some embodiments, aiming system 11 is adapted to incorporate and/or use a communication device (optionally a C4I system) to transfer FOV of each soldier and/or targets and create a "virtual laser marker" (which is passive). The passive virtual laser marker is similar to the regular laser marker, however it can be used for display only or for adding target locks (i.e. automatically lock on that virtual marker). This option enables easy target distribution and excellent common language aid (mutual virtual-pointing devices). The passive virtual laser marker can also be used for accepting multiple target locks from an external system without the need to reveal the locations of the users/soldiers (as markings with active laser markers do).

Training safety mode/feature: In some embodiments, aiming system 11 is adapted to include a training safety mode or feature to improve (practice range) training safety. Here, the system enables firing only toward a target area, for example as defined by an angle from the north (e.g. using a digital compass) or by recognizing range borders such as flags/visual marks in—and not allowing firing at humans. This is like having one large epsilon area, over the entire training area. A GPS can actuate this mode automatically.

Elaborate epsilon logic: According to some embodiments, in one mode of aiming system 11 there are one or more "sets of epsilons". By way of example, there can be a particular "set of epsilons" for charging (e.g. soldiers charging at an enemy position); another set of epsilons for sharp shooting (sniper fire); another set of epsilons for cover fire; another set of epsilons for a return fire mode (e.g. the epsilon may change once being the system detects it has been "fired upon", for example to allow the user to return fire as soon as possible. A further example of such Elaborate epsilon logic is where the logic requires the first few bullets to be with high accuracy (small epsilon area 54) and later allows less accurate firing (larger epsilon area).

It should be understood that the present invention can be implemented with both standard and guided rounds.

Another feature of the present invention is directed at an aiming device for a firearm (or for that matter any aimable device, such as a camera or such as binoculars 10*a* of FIG. 7) equipped with image processor 24 of FIG. 2 and an LRF as range finder 50.

In the case of a conventional aimable device, the LRF, as a stand-alone device or as an integral component of the aimable device, measures the range along the line-of-sight of the aimable device. Because a firearm with an integral LRF, or a stand-alone LRF, usually is a hand-held device, and the user generally is a bit shaky when s/he points the device at the target, the measured range may be the range to background or the range to a different target rather than the range to the desired target. This problem is exacerbated if the target is moving. The LRF may provide a completely wrong range or may provide multiple ranges.

Figure 9:
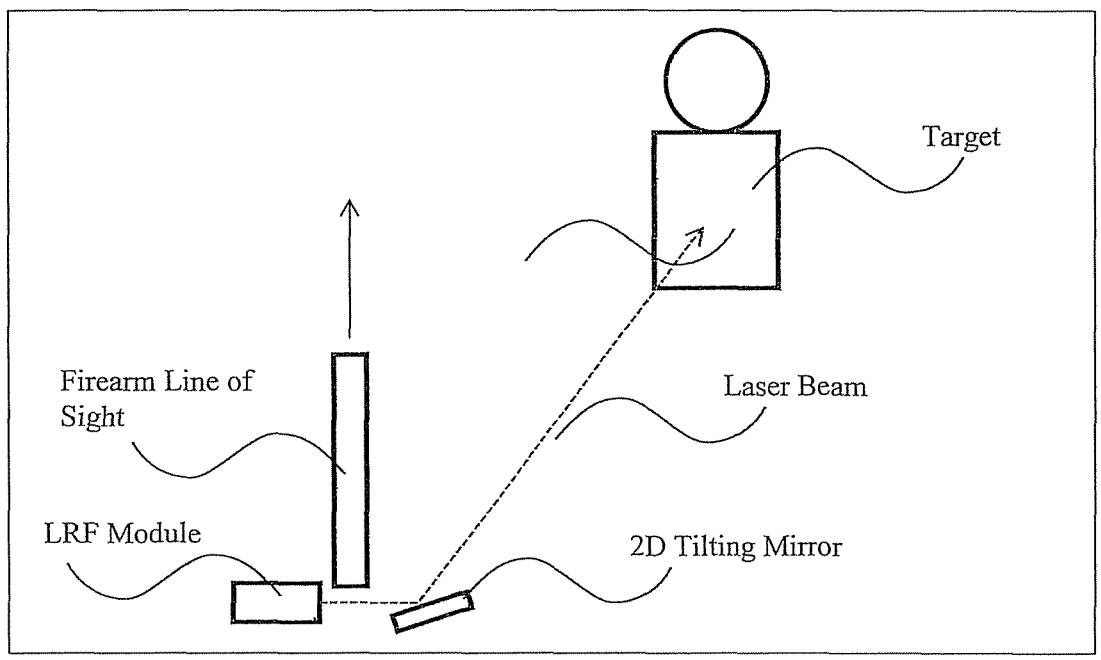
FIG. 9 illustrates the general concept of using a tracker to aim a range finder at a target.

That target tracker 42 tracks a locked-on target enables a range finder 50 such as a LRF to be aimed at the target, rather than along the line-of-sight (LOS) of the aimable device, preferably by target tracker 42 itself as target tracker 42 tracks the target. FIG. 9 illustrates the general concept. A two-dimensional tilting mirror is used by target tracker 42 to aim the pulsed laser beam from LRF 50 at a target that is off the firearm LOS. (The angular deviation of the LOS from the target is exaggerated in FIG. 9 for illustrative purposes; usually, the angular deviation of the LOS from the target is much less than illustrated in FIG. 9.) Because of computational delays in target tracker 42, subsequent to target acquisition the actual aim point of LRF 50 is towards a predicted location of the target relative to the firearm LOS, based on the tracking history of the target and using e.g. a Kalman filter, as is known in the art.

FIGS. 10A-10C illustrate three different embodiments of a range finder 50 that is aimed by target tracker 42. In the embodiment of FIG. 1 OA, the laser beam from the laser source of range finder 50 is reflected by the mirror towards the target. The receiver of range finder 50 is fixed relative to the firearm and has a relatively wide field of view for receiving the laser light that is reflected by the target. In the embodiment of FIG. 10B the receiver of LRF 50 also is fixed but has a narrower field of view than the receiver of FIG. 1 OA; the mirror is made correspondingly wider in order to reflect to the receiver the narrow beam (laser) light that is reflected by the target. In the embodiment of FIG. 10C, instead of using a mirror to aim the narrow beam of range finder 50 at the target, both the laser source and the receiver are mounted on a gimbal that tilts in two dimensions and are aimed by target tracker 42 at the (predicted) angular position of the target.

Figure 11A:
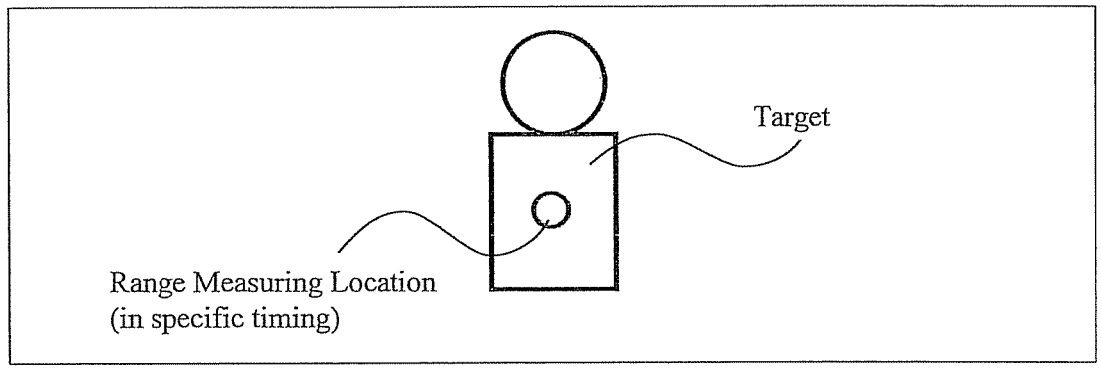
FIG. 11A illustrates the aiming of a range finder at a designated point on a target.
Figure 11B:
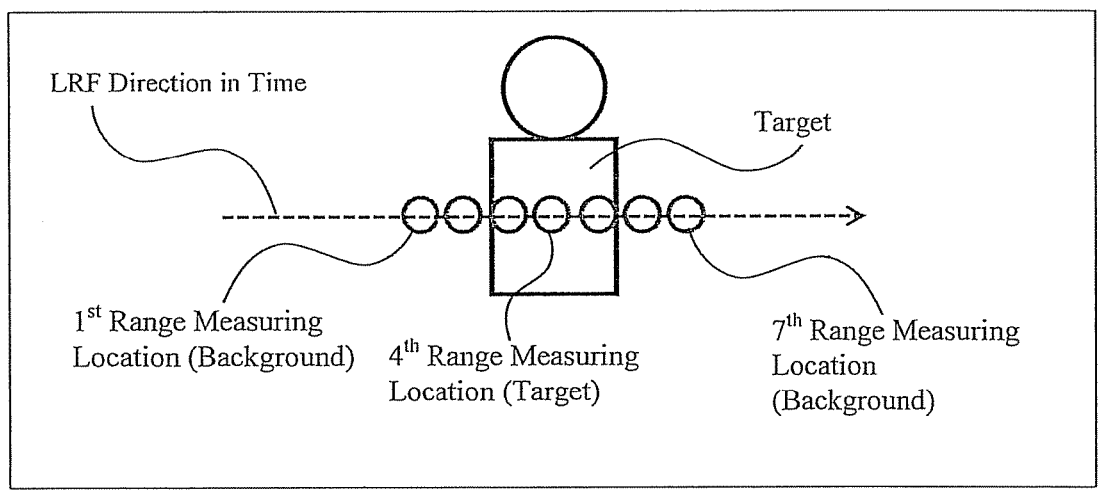
FIG. 11B illustrates one-dimensional scanning of a target.
Figure 11C:
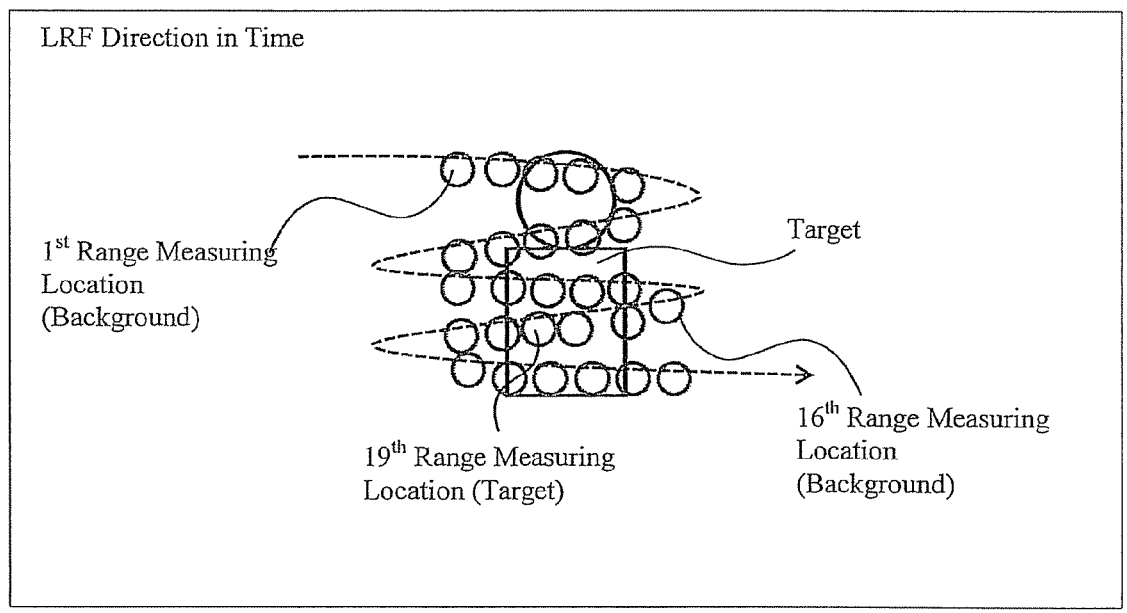
FIG. 11C illustrates two-dimensional scanning of a target.

In one set of embodiments, as illustrated in FIG. 11A, target tracker 42 aims range finder 50 at a designated point on the target, for example at the center of the target. Preferably, the value that actually is used as the measured range to the target is an average of several measurements by range finder 50. In another set of embodiments, target tracker 42 scans the target and the target's immediate surroundings with range finder 50, either in one dimension (along a line that intersects the target), as illustrated in FIG. 11B, or in two dimensions, as illustrated in FIG. 11C. The linear scan of FIG. 11B provides measurements of ranges to both the target and the background and helps to define the boundaries of the target. The areal scan shown in FIG. 11C creates a digital "depth map" of the target and of the target's surroundings, and enables segregation of the target from the background.

Returning to FIG. 7, coupling target tracker 42 (FIG. 2) of image processor 24 to the range finder of monocular/binoculars 10a as described above provides a system that, via communication system 70, transmits the geographical coordinates of a continuously tracked target to a remote location, for example in the context of a C⁴I (Command, Control, Communications, Computers and Information) system. Additionally or alternatively, the laser beam from the range finder may be used to designate the target for attack by a separate weapon system such as a missile equipped with a seeker head.

In an alternative embodiment, the range to the target is found by using structured light to illuminate the scene that includes the target. Imaging system 12 acquires an image of the illuminated scene and image processor 24 uses known methods to calculate the depth (i.e. the range) of pixels in the imaged scene.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A method of acquiring a target, comprising the steps of:
   (a) aiming a non-gimbaled hand-held aimable device that includes:
      (i) a user display,
      (ii) a tracker, and
      (iii) a range finder,
   so that an indicator, in said user display, that indicates a direction in which said device is pointing, is sufficiently close to the target;
   (b) locking said tracker on the target;
   (c) using said tracker to aim said range finder at the target, even when said indicator, in said user display, is not directed at said target; and
   (d) measuring a range to the target, using said range finder, even when said indicator, in said user display, is not directed at said target, obviating the need to aim said aimable device a second time in order to measure said range.

2. The method of claim 1, further comprising the steps of:
   (d) computing geographic coordinates of the target based on said measured range; and
   (e) transmitting said geographic coordinates to a remote location.

3. The method of claim 1, wherein said tracker is operative to scan the target, thereby measuring both said range to the target and a lane it a background of the target.

4. The method of claim 3 rein said scan is a one-dimensional scan.

5. The method of claim 3, wherein said scan is a two-dimensional scan.

6. The method of claim 1, wherein said step of locking on the target is performed automatically.

7. The method of claim 1, wherein said step of locking on the target is performed manually 8. The method of claim 1, further comprising the step highlighting the target on said user display.

9. The method of claim 1, wherein aiming said range finder includes reflecting a laser beam from said ranger tinder by a mirror towards the target.

10. The method of claim 9, further including the step of receiving said laser light that is reflected by the target on a receiver that is fixed relative to the aimable device.

11. The method of claim 9, further including the step of reflecting off said mirror, said laser light that is reflected back by the target, onto a receiver that is fixed relative to the aimable device, 12. The method of claim 1, wherein aiming said range finder includes tilting said range finder on a gimbal.

* * * * *

UNITED STATES PATENT AND TRADEMARK OFFICE
CERTIFICATE OF CORRECTION

| | | |
|---|---|---|
| PATENT NO. | : 9,127,909 B2 | |
| APPLICATION NO. | : 13/769330 | |
| DATED | : September 8, 2015 | |
| INVENTOR(S) | : Avshalom Ehrlich | |

It is certified that error appears in the above-identified patent and that said Letters Patent is hereby corrected as shown below:

In the claims:

Claim 3 line 15 should be corrected as follows:
Change
      -- a lane it --
    to
      "a range to"

Signed and Sealed this
Third Day of May, 2016

Michelle K. Lee
*Director of the United States Patent and Trademark Office*